United States Patent [19]

Wider et al.

[11] Patent Number: 5,009,801

[45] Date of Patent: Apr. 23, 1991

[54] COMPOSITIONS FOR PREVENTING STRESS CRACKS IN POLY(ALKYLENE TEREPHTHALATE) ARTICLES AND METHODS OF USE THEREFOR

[75] Inventors: Michael Wider, Pleasant Ridge; Charles Rossio, Carleton; Christian Remus, Detroit, all of Mich.

[73] Assignee: Diversey Corporation, Mississauga, Ontario, Canada

[21] Appl. No.: 398,542

[22] Filed: Aug. 25, 1989

Related U.S. Application Data

[63] Continuation-in-part of Ser. No. 218,893, Jul. 14, 1988, Pat. No. 4,929,375.

[51] Int. Cl.$^5$ .......................................... C10M 173/02
[52] U.S. Cl. ................................ 252/033.2; 252/33; 252/49.3; 252/51.5 R; 252/56 R
[58] Field of Search ....................... 252/49.3, 33.2, 33

[56] References Cited

U.S. PATENT DOCUMENTS

| | | | |
|---|---|---|---|
| 3,372,117 | 3/1968 | Jones et al. | 252/49.3 |
| 3,425,940 | 2/1969 | Norton | 252/49.3 |
| 3,583,914 | 6/1971 | Garvin et al. | 252/49.3 |
| 3,860,521 | 1/1975 | Aepli et al. | 252/49.3 |
| 4,486,324 | 12/1984 | Korosec | 252/49.3 |
| 4,604,220 | 8/1986 | Stanton | 252/49.3 |
| 4,759,861 | 7/1988 | Ogura et al. | 252/49.3 |
| 4,778,614 | 10/1988 | Rawlinson et al. | 252/49.3 |
| 4,929,375 | 5/1990 | Rossio et al. | 252/49.3 |

Primary Examiner—Jacqueline V. Howard
Assistant Examiner—Ellen M. McAvoy
Attorney, Agent, or Firm—William D. Blackman; Arnold S. Weintraub

[57] ABSTRACT

Stress cracking in poly(alkylene terephthalate) articles of manufacture is prevented by applying to the article a hydrophilic-substituted aromatic hydrocarbon having either an alkyl or aryl side chain, such as, sodium xylene sulfonate. Preferably, the stress crack inhibitor is applied to the article in the form of an aqueous fatty acid-based lubricant.

14 Claims, No Drawings

COMPOSITIONS FOR PREVENTING STRESS CRACKS IN POLY(ALKYLENE TEREPHTHALATE) ARTICLES AND METHODS OF USE THEREFOR

CROSS-REFERENCE TO RELATED APPLICATIONS

This application is a continuation-in-part application of copending U.S. patent application Ser. No. 218,893, filed July 14, 1988, now U.S. Pat. No. 4,929,375; for "Conveyor Lubricant Containing Alkyl Amine Coupling Agents", the disclosure of which is hereby incorporated by reference.

BACKGROUND OF THE INVENTION

1. Field of the Invention

The present invention pertains to compositions for inhibiting stress cracking in poly(alkylene terephthalate) articles of manufacture. More particularly, the present invention concerns aqueous-based fatty acid lubricant compositions containing such stress crack inhibitors. Even more particularly, the present invention concerns aqueous fatty acid-based lubricant concentrates and use solutions therefor which contain such stress crack inhibitors.

2. Prior Art

As is known to those skilled in the art to which the present invention pertains there has been an ever increasing usage of synthetic resinous containers for fluids and solids. Likewise, as is known to those skilled in the art, such containers are normally filled or washed by passing them through filling and capping stations or through a washing system along manually, mechanically or electronically-operated conveyor systems.

In order to ensure efficient operation of the filling or washing systems it is essential that the conveyor systems, per se, be continuously lubricated. Otherwise, the containers may stack up along the conveyor system and their movement could be impeded.

Thus, the conveyors are, ordinarily, continuously lubricated by applying to the conveyor a lubricant, such as by spraying or the like. Typically, conventional lubricants contain amines, alcohols and other constituents which have a deleterious effect on the poly(alkylene terephthalate) article disposed along the conveyor system.

Indeed, it has long been known that exposure by such articles to these lubricants leads to a phenomenon which has been identified as "stress cracking" and is especially prevalent in poly(alkylene terephthalate) containers and other such articles of manufacture. This is true with respect to both poly(ethylene terephthalate) and poly(butylene terephthalate) containers.

As noted, conventional aqueous-based lubricants containing alcohols and/or amines do not inhibit or prevent stress cracking in such containers, but rather, promote stress cracking.

In the copending application referred to above, there is disclosed a highly dilutable aqueous lubricant concentrate which appears to inhibit stress cracking by combining a tertiary alkyl amine as a saponifying agent, and an alkyl aryl sulfonate, as a solubilizing agent for a long chain fatty acid. While the compositions of the copending application are efficacious for preparing highly dilutable lubricants, it has now been found that the tertiary amine, per se, is not essential to the prevention of stress cracking, in poly(alkylene terephthalate) articles. Rather, it has now been found that a certain class of alkyl aryl sulfonates and other hydrophile-terminated aromatic compounds, when combined with free-base amines, will inhibit stress cracking when formulated into fatty acid lubricants. This finding enables the production of dilutable, cost efficient, fatty acid-based aqueous lubricant compositions without any dilatory effects caused by the presence of the amine. Likewise, this finding enables implementation of other means and methods for inhibiting stress cracking in poly(alkylene terephthalate) articles.

Heretofore, the only proposed method of inhibiting stress cracking in plastic bottles known to the applicants, has been the incorporation of an alkali metal salt of a hydrophilic substituted aromatic hydrocarbon and other hydrotropes into a liquid bleach, such as disclosed in EPA, EP No. 302705 AZ, filed Feb. 8, 1989. This application discloses the use of the hydrotropes as an adjustment to the bleach to inhibit stress cracking in high density polyethylene containers. Yet, the art has not directed itself to lubricants and other media for inhibiting stress cracking in polyethylene or polybutylene terephthalate bottles or other articles of manufacture.

SUMMARY OF THE INVENTION

In a first aspect of the present invention stress cracking in poly(alkylene terephthalate) articles of manufacture is prevented by applying to the article of manufacture an alkali metal salt of a hydrophilic-substituted aromatic hydrocarbon having an aromatic or alkyl side chain.

In another aspect of the present invention an aqueous-based fatty acid lubricant composition is prepared from a concentrate comprising:

(a) a long-chain fatty acid,
(b) a saponifying agent for the fatty acid,
(c) a chelant or sequestrant,
(d) the stress crack inhibitor, and
(e) water.

The saponifying agent neutralizes the fatty acid. The saponifying agent is, preferably, a free-base amine, although other saponifying agents may be used.

Optimally, the stress crack inhibitor is the sodium sulfonate of the aromatic hydrocarbon and is selected from the group consisting of sodium xylene sulfonate, sodium decyl diphenyl oxide sulfonate, sodium dimethyl napthalene sulfonate and mixtures thereof.

Ordinarily, the stress crack inhibitor is present in the concentrate in an amount ranging from about at least 20 percent to about forty percent, by weight, based on the total weight of the concentrate.

In use, the concentrate may be diluted with water in concentrations ranging from about 1:100 to about 1:1000, by weight, to form a use solution. The use solution may be applied by manual application, spraying or the like.

Likewise, the stress crack inhibitor may be applied directly to the container as a pre-treatment coating or may be incorporated as a rinse aid during a washing cycle for a bottling operation.

For a more complete understanding of the present invention reference is made to the following detailed description and accompanying examples.

DESCRIPTION OF THE PREFERRED EMBODIMENT

As noted hereinabove, the present invention, in a first aspect provides a method for inhibiting stress cracking in a poly(alkylene terephthalate) article of manufacture by applying thereto a hydrophilic-substituted aromatic hydrocarbon having an alkyl or aromatic side chain. More particularly, the present invention contemplates applying to such synthetic resinous articles of manufacture, a sodium salt of a hydrophilic-substituted aromatic compound having an alkyl or aromatic side chain, as a stress crack inhibitor.

In a further aspect hereof, the present invention, generally, provides a fatty-acid based aqueous lubricant concentrate and a use solution prepared therefrom which incorporates the stress cracking preventative.

The lubricant concentrate contemplated herein, generally, comprises:
(a) a fatty acid,
(b) a saponifying agent for the fatty acid,
(c) a chelant or sequestrant,
(d) the stress crack inhibitor defined hereinabove, and
(e) water.

More particularly, the concentrate comprises, by weight:
(a) from about 0.25 to 35 percent, of the fatty acid,
(b) from about 2 to 10 percent of the saponifying agent,
(c) from about 2 to 20 percent of the sequestrant,
(d) at least about 10 to about 35 percent of the stress crack inhibitor, and
(e) from about 5 to 75 percent of water.

Preferably, the concentrate, comprises, by weight:
(a) from about 5 to 20 percent of the fatty acid,
(b) from about 3 to 6 percent of the saponifying agent,
(c) from about 7 to 15 percent of the chelant,
(d) from about 20 to 30 percent of the stress crack inhibitor, and
(e) from about 34 to 67 percent of water.

In use, the concentrate is diluted with water in a respective weight ratio of from about 1:100 to about 1:1000, and, preferably, from about 1:100 to about 1:300. The use solution is prepared by admixing the concentrate with water at ambient conditions.

The stress crack inhibitor, as noted, is a hydrophilic-substituted aromatic hydrocarbon having an alkyl or aryl side chain. Optimally, the stress crack inhibitor is the sodium salt of a hydrophilic-substituted aromatic hydrocarbon having an alkyl or aryl side chain and, in particular, the sodium salt of a sulfonated aromatic hydrocarbon having an alkyl or aryl side chain.

Representative of the type of stress crack inhibitor contemplated herein is, for example, sodium xylene sulfonate, sodium decyl diphenyl oxide, sodium dimethyl naphthalene sulfonate, sodium salts of linear alkyl benzene sulfonates, ordinarily having from about $C_8$ to about $C_{12}$ in the alkyl portion and the like, as well as mixtures thereof. The preferred stress crack inhibitor is sodium dimethyl naphthalene sulfonate.

It should be noted, and as is apparent, that the stress crack inhibitors are, also, solubilizing agents, as well as anionic surfactants. This multi-functionality, thus, contributes to the solubilizing of the fatty acid and the detergency of the lubricant prepared therefrom.

Although not wishing to be bound by any theory it would appear that the present stress crack inhibitors "mask" the reactive sites on poly(alkylene terephthalate) articles of manufacture and prevent attack on the ester sites. As is known, PET or poly(ethylene terephthalate) articles, such as beverage containers and the like, are synthesized by the following reaction:

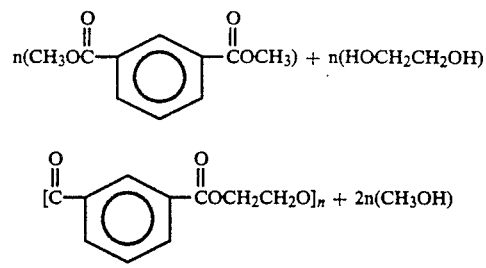

These containers and the like are subjected to cracking along the lines of stress on the surface thereof by aqueous bottling lubricants either by attack on the ester linkage or direct solvent action which destroys the polymeric chain, thereby leading to structural failure.

It is theorized that the benzene ring of the stress crack inhibitor overlies the terephthalate ester linkages in proximity to the inhibitor and, thus, prevents the attack thereon by any reagent capable of attacking the ester linkage, e.g. amines and alcohols, which are usually present in lubricant systems.

It is to be noted that the present invention is equally applicable to PBT or poly(butylene terephthalate) containers and other such articles of manufacture.

In use and as above noted the stress crack inhibitor is present in an amount of at least 10 percent, by weight, based on the total weight of the concentrate.

As noted hereinabove, the lubricant concentrate used to apply the stress crack inhibitor is a fatty acid-based lubricant. Useful fatty acids are the long chain carboxylic acids having from about 12 to 22 carbon atoms in the alkyl portion thereof. The fatty acid may be either saturated or unsaturated or may be a mixture of such acids.

Representative of the fatty acids which may be used are coconut oil fatty acid, lauric acid, myristic acid, palmitic acid, oleic acid, linoleic acid, linolenic acid and the like, as well as mixtures thereof. The preferred fatty acid for the lubricant formula is a mixture of coconut oil fatty acid and oleic acid. In the mixture the oleic and coconut oil fatty acids are each generally present in an amount between about 0.25 parts and about 15 parts by weight based on total concentrate weight and preferably between about 0.25 parts and about 7 parts by weight based on total concentrate weight.

The saponifying agent is used to neutralize the fatty acid to render it water-soluble. Typically, fatty acids are saponified with alkali metal hydroxides, such as potassium hydroxide, in fatty acid lubricants. However, it has been found that potassium hydroxide contributes to and promotes stress cracking in PET and PBT articles of manufacture. It has further been found the stress crack inhibitors hereof, which create a steric hindrance, do not preclude and overcome the cracking caused by potassium hydroxide, but does inhibit stress cracking in other circumstances.

A particularly preferred class of saponifying agents for use herein are free-base amines, including primary, secondary and tertiary amines.

Various free-base alkyl amines can be successfully employed in this invention. The alkyl amine saponifying agents useful herein are, preferably, amines having the general formula:

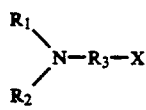

wherein $R_1$ and $R_2$ are hydrogen, alkoxylate, or alkyl, $R_3$ is an unsubstituted linear alkyl group having from 2 to 12 carbon atoms and, preferably, from 6 to 10 carbon atoms and X is either hydrogen or a hydrophilic group.

Where X is hydrogen, among the useful amines are, for example, decyl dimethyl amine, N,N-dimethyl octyl amine, octyl amine, nonyl amine, decyl amine, ethyl octyl amine, ethyl hexyl amine and 2-ethyl-1-hexamine and the like, as well as mixtures thereof. The preferred amine is N,N-dimethyl octyl amine.

Useful hydrophilic groups include, for example, $-NH_2$, $-OH$, $SO_3$, alkoxylate, and the like.

However, because of the toxicity normally associated with alkyl amines, it is more advantageous to employ either alcohol or alkoxylated, and in particular, ethoxylated amines as the saponifying agent.

When X is OH, among the useful alcohol amines are primary, secondary and tertiary alcohol amines. Representative of such compounds are, for example, monoethanol amine, diethanol amine, triethanolamine, dimethyl amino ethanol, and the like as well as mixtures thereof.

When X is $-NH_2$, a particularly useful amine is dimethyl amino propoyl amine. When X is $SO_3$, a useful compound is dimethyl taurine.

Among the useful alkoxylated amines are, the ethoxylated amine for example, tallow (ethoxylated) amine, coconut (ethoxylated) amine. These compounds are well known and commercially available.

In practicing the present invention the preferred amine is coconut (ethoxylated) amine.

As hereinabove noted the amine is employed as the free-base amine.

Likewise, conventional saponifying agents, such as sodium hydroxide, may be used alone or in admixture with the free-base amine, since it has been found that the sodium cation does not attack the article.

The lubricant concentrate also contains a hardness sequestrant or chelant, for the purpose of sequestering $Mg^+$ and $Ca^+$ ions present in the water. The sequestrant may comprise either an organic or inorganic sequestrant. Useful organic sequestrants are alkali metal salts of ethylene diamine tetraacetic acid (EDTA), gluconic acid, phosphonic acid, nitrilotriacetic acid (NTA) and the like, as well as mixtures thereof. Examples of inorganic sequestrants are the phosphate hardness sequestrants, such as sodium tripolyphosphate. Although any of the enumerated sequestrants may be effectively integrated herein, preferably, the alkali metal salt of EDTA is employed. $Na_4EDTA$ sold under the trade name Versene® and available from Dow Chemical Corporation is utilized herein. Where used, and as noted, the hardness sequestrant is present in an amount of between about 2 and about 15 parts by weight based on total concentrate weight.

In preparing a lubricant concentrate in accordance herewith the stress crack inhibitor and the water are mixed together and heated to a temperature of about 100° F. to 120° F. While maintaining this temperature, the sequestrant, acid saponifier and fatty acid, are sequentially added, in that order, to the solution, with mixing, after the addition of each component.

To form a use solution, the present concentrate is diluted with water in a respective weight ratio, ranging from about 1:100 to about 1:1000, and, in particular, from about 1:100 to about 1:300. The use solution is prepared by mixing the concentrate with water.

It should, also, be noted that the stress crack inhibitor may be otherwise applied to the container, such as by directly coating the container therewith as a pre-treatment.

Alternatively, the stress crack inhibitor may be incorporated into a rinse and applied therewith during a rinsing cycle normally associated with a bottling operation.

Furthermore, the stress crack inhibitor may be applied in poly(alkylene terephthalate) mold grease, etc. and the like.

For a more complete understanding of the present invention reference is made to the following examples. In the examples, which are illustrative and not limitative, all parts are by weight.

EXAMPLE I

A conveyor lubricant concentrate was prepared by mixing together at 120° F., with stirring, water and a stress crack inhibitor. Thereafter, while maintaining the temperature, there was sequentially added to the solution, a sequestrant, an amine and a long chain fatty acid.

The ingredients employed and their, respective, amounts are shown below.

| Ingredient | Parts |
| --- | --- |
| Sodium Decyl Diphenyl Oxide Sulfonate | 30 |
| EDTA[(1)] | 7 |
| Oleic Acid | 7 |
| Coconut Oil | 7 |
| Octyl Dimethyl Amine | 8 |
| Water | 41 |

[(1)] a 39 percent solution of EDTA sold under the mark VERSENE

EXAMPLE II

Following the procedure of Example I, a further lubricant concentrate was prepared from the following:

| Ingredient | Parts |
| --- | --- |
| Sodium Dimethyl Naphthalene Sulfonate | 20 |
| Sodium Decyl Diphenyl Oxide Sulfonate | 10 |
| EDTA[(1)] | 7 |
| Oleic Acid | 7 |
| Coconut Oil Fatty Acid | 7 |
| Dimethyl Octyl Amine | 8 |
| Water | 41 |

[(1)] Same as in Example I

EXAMPLE III

Following the procedure of Example I, a lubricant concentrate was prepared from the following:

| Ingredient | Parts |
| --- | --- |
| Sodium Dimethyl Naphthalene Sulfonate | 30 |
| EDTA[(1)] | 7 |
| Oleic Acid | 3 |
| Coconut Oil Fatty Acid | 3 |
| Coconut (ethoxylated) Amine | 8 |

| Ingredient | Parts |
| --- | --- |
| Water | 49 |

(1) Same as in Example I

EXAMPLE IV

To test the efficacy of the present invention, a series of two liter six-pronged poly(ethylene terephthalate) bottles were pressurized at ambient temperatures by adding to the bottle 1850 parts of top water, 45 parts of sodium bicarbonate and 45 parts of citric acid. Thereafter, the cap was placed back on the bottle, tightened and the bottle was inverted.

A series of aqueous concentrates were, then, applied, dropwise, between the grooves of the feet of the bottle.

The following table sets forth the ingredients, their amounts and the observed results regarding stress cracking for each of the concentrates.

| | Ingredient, amt, pbw | | | | |
| --- | --- | --- | --- | --- | --- |
| | Formula 1 | Formula 2 | Formula 3 | Formula 4 | Formula 5 |
| Coconut Oil | 5 | 5 | 7 | 2 | 3 |
| Oleic Acid | 5 | 5 | 7 | 6 | 3 |
| Dimethyl Octyl Amine(1) | — | — | 8 | | |
| Tallow Ethoxylated Amine(2) | | 8 | | | |
| Coconut Exthoxylated Amine(2A) | 10 | — | — | 8 | 8 |
| NaOH(3) | | 1 | — | — | — |
| Dimethyl Octyl Amine | — | — | — | — | — |
| Sodium Xylene Sulfonate | 5 | — | — | — | — |
| Sodium Decyl Diphenyl Oxide Sulfonate(4) | — | — | 34 | — | — |
| Sodium Dimethyl Naphthalene Sulfonate(5) | 20 | 30 | | 10 | — |
| Sodium Ethylene Diamine Tetraacetic Acid(6) | 15 | 14 | 7 | 7 | 7 |
| Alpha Olefin Sulfonate(7) | 5 | — | — | 20 | 20 |
| Water | 35 | 37 | 37 | 47 | 59 |

(1) sold commercially under the name ADMA 8
(2) sold commercially under the name Varonic K210
(2A) sold commercially under the name Varonic T210
(3) present as a saponifying agent
(4) sold commercially under the name DOWFAX B32
(5) sold commercially under the name PETRO LBA
(6) as a 39% sodium solution under the name Versene
(7) present as a foaming and detergency aid In visual observations, it was observed that Formula 2 was the best in preventing stress cracking, followed by, in order 1, 4, 3 and 5. It is noted that Formula 5 contained no stress crack inhibitor and, thus, defined the reference point for the data set forth in the table.

Having, thus, described the invention, what is claimed is:

1. A method of inhibiting stress cracking in a poly(alkylene terephthalate) article of manufacture, comprising:
applying a lubricant to an exterior surface of the poly(alkylene terephthalate) article of manufacture, the lubricant comprising a stress crack inhibitor which comprises a hydrophilic-substituted aromatic hydrocarbon having either an alkyl or an aryl side chain.

2. The method of claim 1 wherein the stress crack inhibitor is the sodium salt of a hydrophilic-substituted aromatic hydrocarbon having either an alkyl or aryl side chain.

3. The method of claim 2 wherein: the stress crack inhibitor is selected from the group consisting of:
   (a) sodium xylene sulfonate,
   (b) sodium decyl diphenyl oxide sulfonate,
   (c) sodium dimethyl naphthalene sulfonate,
   (d) sodium salt of a linear alkyl benzene sulfonate, and
   (e) mixtures thereof.

4. The method of claim 3 wherein the lubricant comprises:
   (a) water, and
   (b) a concentrate, comprising:
       (1) a fatty acid,
       (2) a sequestrant,
       (3) a saponifying agent which does not chemically attack the article of manufacture or which is capable of being sterically hindered by the stress crack inhibitor;
       (4) the stress crack inhibitor, and
       (5) water.

5. The method of claim 4 wherein:
   (a) the fatty acid is a long-chain carboxylic acid having from 12 to 20 carbon atoms in the alkyl portion thereof, and
   (b) the saponifying agent is a free-base alkyl amine.

6. The method of claim 5 wherein:
the amine is selected from the selected group consisting of tallow (ethoxylated) amine, coconut (ethoxylated) amine, monoethanol amine and mixtures thereof.

7. The method of claim 6 wherein the concentrate comprises:
   (a) from about 0.25 percent to about 35 percent, by weight, of the fatty acid;
   (b) from about 2 percent to about 20 percent, by weight, of the sequestrant;
   (c) from about 2 percent to about 10 percent, by weight, of the fatty acid neutralizer;
   (d) from at least about 10 percent to about 35 percent, by weight, of the stress crack inhibitor, and
   (e) from about 5 percent to about 75 percent, by weight, of water.

8. The method of claim 7 wherein the concentrate is applied as an aqueous use solution, the concentrate being present in the use solution in a respective weight ratio of about 1:100 to about 1:1000.

9. The method of claim 8 wherein the article of manufacture is either a poly(ethylene terephthalate) or a poly(butylene terephthalate) article of manufacture.

10. A lubricant concentrate for inhibiting stress cracking in a poly(alkalene terephthalate) article of manufacture when a use solution thereof is applied thereto, comprising:
- (a) a fatty acid,
- (b) a sequestrant,
- (c) a stress crack inhibitor which is a hydrophilic-substituted aromatic hydrocarbon having an alkyl or aryl side chain,
- (d) a saponifying agent for the fatty acid, the saponifying agent being inert to poly(alkaline terephthalate) articles of manufacture or being capable of being sterically hindered by the stress crack inhibitor, and which is selected from the group consisting of coconut (ethoxylated) amine, tallow (ethoxylated) amine and mixtures thereof, and
- (e) water.

11. The lubricant concentrate of claim 10 wherein: the stress crack inhibitor is the sodium salt of a hydrophilic-substituted aromatic hydrocarbon having either an alkyl or aryl side chain.

12. The lubricant concentrate of claim 10 wherein: the stress crack inhibitor is selected from the group consisting of:
- (a) sodium xylene sulfonate,
- (b) sodium decyl diphenyl oxide sulfonate,
- (c) sodium dimethyl naphthalene sulfonate,
- (d) the sodium salt of a linear alkyl benzene sulfonate, and
- (e) mixtures thereof.

13. The lubricant concentrate of claim 12 wherein:
- (a) the fatty acid is a long-chain carboxylic acid having from 12 to 22 carbon atoms in the alkyl portion thereof, and
- (b) the saponifying agent is a free-base amine.

14. The lubricant concentrate of claim 10 wherein the concentrate includes:
- (a) from about 0.25 percent to about 35 percent, by weight, of the fatty acid;
- (b) from about 2 percent to about 20 percent, by weight, of the sequestrant;
- (c) from about 2 percent to about 10 percent, by weight, of the fatty acid saponifying agent;
- (d) from at least about 10 percent to about 35 percent, by weight, of the stress crack inhibitor, and
- (e) from about 5 percent to about 75 percent, by weight, of water.

* * * * *